(12) United States Patent
Benson et al.

(10) Patent No.: US 8,709,635 B1
(45) Date of Patent: *Apr. 29, 2014

(54) ALUMINUM GALVANIC CELL

(71) Applicant: University of South Florida, Tampa, FL (US)

(72) Inventors: Robert Frederick Benson, St. Petersburg, FL (US); Andres M. Cardenas-Valencia, Tampa, FL (US); Lawrence C. Langebrake, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,724

(22) Filed: Sep. 19, 2012

Related U.S. Application Data

(60) Continuation of application No. 12/971,600, filed on Dec. 17, 2010, now abandoned, which is a division of application No. 10/709,173, filed on Apr. 19, 2004, now Pat. No. 7,855,015.

(60) Provisional application No. 60/320,117, filed on Apr. 17, 2003.

(51) Int. Cl.
*H01M 6/30* (2006.01)
*H01M 6/32* (2006.01)
*H01M 6/04* (2006.01)

(52) U.S. Cl.
USPC .......................................... 429/118; 428/188

(58) Field of Classification Search
USPC .................. 429/402, 405, 219, 110, 118, 188
See application file for complete search history.

(56) References Cited

U.S. PATENT DOCUMENTS

| 3,330,701 | A | * | 7/1967 | McElhill et al. | 429/213 |
| 3,944,435 | A | * | 3/1976 | Kordesch | 429/206 |
| 5,476,730 | A | * | 12/1995 | Okamura et al. | 429/405 |

* cited by examiner

*Primary Examiner* — Gregg Cantelmo
(74) *Attorney, Agent, or Firm* — Nicholas Pfeifer; David Jacobs; Smith & Hopen, P. A.

(57) ABSTRACT

The present invention provides a galvanic cell having an aluminum anode and a cathode compartment design suitable for carrying out the aqueous electrochemical reaction between solid aluminum metal and aqueous peroxide ions. The galvanic cell is activated when water, aqueous hydroxide solution, or an aqueous salt solution is added to the cell. This reaction releases a significant amount of electrochemical energy from a small size (mass or volume) cell. This cell reaction and design leads to an improvement in energy released over state-of-the-art aluminum/hydrogen peroxide galvanic cells.

13 Claims, 10 Drawing Sheets

ALUMINUM GALVANIC CELL

CROSS REFERENCE TO RELATED APPLICATIONS

This application claims priority to U.S. patent application Ser. No. 12/971,600, entitled "Aluminum Galvanic Cell", filed Dec. 17, 2012, which is a divisional application of U.S. Pat. No. 7,855,015, entitled "Aluminum and Solid Alkali Peroxide Galvanic Cell", filed Apr. 19, 2004 which claims priority to Provisional U.S. Patent Application No. 60/320,117, entitled "Aluminum Galvanic Cell", filed Apr. 17, 2003.

GOVERNMENT STATEMENT

The invention was made with Government support under Grant No. DASG60-00-C-0089 awarded by the U.S. Army Space Missile Defense Command. The Government has certain rights in the invention.

BACKGROUND OF THE INVENTION

Galvanic cells having an aluminum anode are highly desirable as an energy source because of their high theoretical energy densities. Aluminum in aqueous solution has a standard oxidation potential of +1.7 v with 3 electrons transferred. If the aluminum electrode forms a galvanic couple in basic solution, producing either aluminum hydroxide or aluminate ion, the electrode couple has an oxidation potential of +2.3 v with 3 electrons transferred. When these electrochemical properties are considered along with the low density and small atomic weight, a theoretical energy density of 24.7 kJ/gram for the aluminum anode make it among the highest energy density anode materials. However, in alkaline aqueous electrolytes, two problems reduce aluminum anode performance. Side reactions compete with the electrochemical reactions and overvoltage effects reduce the cell energy output well below the theoretical value. As a result the anode efficiency is much lower than expected.

A variety of cathode reactions have been coupled with an aluminum anode in an aqueous alkaline electrolyte to form high-energy galvanic cells. In each case presented in the prior art galvanic designs, the lack of an efficient cathode reaction at a sufficient cathode potential is the major obstacle to development of high performance aluminum anode galvanic cells. A variety of aluminum anode galvanic cell systems are known in the art, including Al/Air ($O_2$), Al/$H_2O_2$, Al/$MnO_2$, Al/AgO, Al/S, Al/$K_3Fe(CN)_6$, and Al/NiOOH. All of the cathode reactions for these galvanic cells produce hydroxide ion to react with the aluminum to form either $Al(OH)_{3(s)}$ or $Al(OH)_{4(aq)}^{-1}$ as products. As an example, the reactions for the system, Al/$H_2O_2$, in an alkaline electrolyte are represented by four competing reactions, electrochemical, corrosion, direct, and decomposition as shown below:

Electrochemical: $2Al_{(s)} + 3H_2O_{2(aq)} + 2OH_{(aq)}^{-1} \rightarrow 2Al(OH)_{4(aq)}$ Corrosion: $2Al_{(s)} + 6H_2O \rightarrow 2Al(OH)_{3(s)} + 3H_{2(g)}$ Direct: $2Al_{(s)} + 3H_2O_{2(aq)} \rightarrow 2Al(OH)_{3(s)}$ Decomposition: $2H_2O_{2(aq)} \rightarrow O_{2(g)} + 2H_2O_{(l)}$ Similar competing reactions are present to some extent in the other galvanic cell systems listed above. As such, alkali aluminum anode galvanic cell systems depend upon the cathode reaction to produce hydroxide ion in order to release electrical energy. Competing reactions become a problem when the hydroxide ion concentration is out of balance with the rest of the galvanic cell.

Balance of the cathode reaction based upon the reduction of hydrogen peroxide to produce hydroxide ions with the anode reaction of aluminum oxidation is the issue that leads to optimum energy output from the galvanic cell. Since hydrogen peroxide is a very weak acid, it is initially present in the electrolyte as the undissociated molecule. In the presence of hydroxide ion the hydrogen peroxide is hydrolyzed to the hydroperoxide ion. Catalytic decomposition of the undissociated hydrogen peroxide to release oxygen at the electrode competes with the combined hydrolysis and electron transfer to form hydroxide ion. The cathode reactions can be summarized as follows:

$H_2O_{2(aq)} + H_2O_{(l)} \rightarrow O_2H_{(aq)}^{-1} + H_3O_{(aq)}^{+1}$ $H_3O_{(aq)}^{-1} + OH_{(aq)}^{-1} \rightarrow 2H_2O_{(l)}$ $O_2H_{(aq)}^{-1} + H_2O_{(l)} + 2e \rightarrow 3OH_{(aq)}^{-1}$  $E° = +0.87$ v overall $H_2O_{2(aq)} + OH_{(aq)}^{-1} + 2e \rightarrow 3OH_{(aq)}^{-1}$ Hydrogen peroxide ion requires the initial presence of hydroxide ion in the cathode compartment in order to prevent or restrict the catalyzed decomposition of peroxide and the release of oxygen gas.

The release of hydrogen from the aluminum corrosion reaction and the release of oxygen from the hydrogen peroxide decomposition reaction are problems in galvanic cells with an aluminum anode and hydrogen peroxide cathode reaction because pockets of gas interfere with the electrode processes. Aluminum hydroxide scale forms around the anode as the alkali hydroxide is depleted. Even if the hydrogen evolution is controlled, the formation of a solid aluminum hydroxide coating on the aluminum anode interferes with the anode reaction. Loss of aluminum and oxygen by means of the side reactions inherent in the prior art galvanic cells represents serious losses in cell efficiency and power delivery.

Additionally, several aluminum reactions can occur at the anode that depend upon the conditions in the electrochemical cell. Hydroxide ion levels at the anode influence the selectivity to form two aluminum products as shown below:

$Al_{(s)} + 4OH_{(aq)}^{-1} - 3e \rightarrow Al(OH)_{4(aq)}^{-1}$  $E° = +2.3$ v $Al_{(s)} + 3OH_{(aq)}^{-1} - 3e \rightarrow Al(OH)_{3(s)}$  $E° = +2.3$ v The resultant product in the electrochemical reaction depends upon the levels of hydroxide ion available at the anode. Conditions for the optimum performance of the resultant galvanic cell favor the formation of the soluble aluminate ion. Deposition of the aluminum hydroxide is a problem when hydroxide levels are not adequate because the coating hampers the interaction of the aluminum electrode with the electrolyte solution.

Several techniques in the prior art have been used to avoid or reduce the impact of the side reactions and improve cell performance. Special alloys of aluminum containing, magnesium, tin, or gallium have been used to improve the reaction at the anode and avoid scale formation. While a better alloy for the anode does increase power delivered by the cell, it does not avoid the side reactions that cause problems and reduce the cell efficiency and output. Flushing fresh electrolyte through both anode and cathode compartments has been used in prior art galvanic cells to dislodge bubbles of hydrogen or oxygen gases and scale forming solids. This method temporarily improves cell performance but does not improve the capabilities of the cell. A porous cathode has been used to partition the hydrogen peroxide reactions from the anode compartment. Cell performance depends upon the levels of hydroxide ion in the electrolyte. High hydroxide ion concentrations have been used to improve the cathode while the corrosion at the anode is uncontrolled. At low hydroxide levels, aluminum hydroxide scale forms as a coating on the anode and other surfaces within the anode compartment. Formation of soluble aluminate ion depends upon sufficient levels of alkali hydroxide in the electrolyte.

Accordingly, there is a need in the art for an improved electrochemical cell utilizing an aluminum anode that greatly reduces electrode scaling and side reactions associated with present systems known in the art, thereby providing a high-energy galvanic cell.

SUMMARY OF INVENTION

This invention provides an improved galvanic cell having an aluminum anode and a cathode compartment design suitable for carrying out the aqueous electrochemical reaction between solid aluminum metal and aqueous peroxide ion. The galvanic cell is activated when water, aqueous hydroxide solution, or an aqueous salt solution is added to the cell. This reaction releases a significant amount of electrochemical energy from a small size, either mass or volume of the cell. This cell reaction and design leads to an improvement in energy released over state-of-the-art aluminum/hydrogen peroxide galvanic cells.

In accordance with the present invention, an electrochemical cell having an aluminum anode spaced from an alkali metal peroxide cathode by an electrically insulating barrier is provided. In a particular embodiment of the present invention, the electrochemical cell further includes an electrolyte solution, wherein the anode and the cathode are positioned within the electrolyte solution. It is within the scope of the present invention for the electrolyte solution to be included with the galvanic cell or to be introduced into the cell as required utilizing microfluidics or other introduction means known in the art.

In a particular embodiment of the present invention, the alkali metal peroxide cathode further includes a metal electrode and sodium peroxide. The sodium peroxide may be enclosed in a fiberglass cloth and positioned such that upon dissolution of the solid sodium peroxide in liquid, the solution will pass through the metal electrode. The metal electrode in this case may be a woven mesh fabricated of silver plated copper wire. Additionally, the sodium peroxide may be a solid granular sodium peroxide.

Efficiency of the cell is improved when the aluminum employed in the anode is at least 99.999% pure aluminum, while other percentages of aluminum for the anode are also within the scope of the invention.

It is within the scope of the invention to employ a variety of solutions for the electrolyte. Acceptable electrolyte solutions include, potassium chloride and potassium hydroxide. Additionally, the activator utilized to initiate the electrochemical reaction within the cell may be water, potassium chloride, aqueous hydroxide solution, aqueous salt solution or any other solution that is effective in initiating the electrochemical reaction upon contact with the cathode of the cell.

In one embodiment of the electrochemical cell of the present invention, the electrically insulating barrier positioned between the anode and the cathode is a membrane of fiberglass cloth positioned to restrict direct contact between the anode and the cathode.

Other materials known in the art to provide an electrically insulating barrier are within the scope of the present invention.

In addition to the benefits provide by the use of an alkali metal peroxide cathode, the present invention also provide improvements in the performance of the galvanic cell by establishing an optimal area ratio between the cathode and the anode. This improvement is realized in other aluminum anode galvanic cells, including, Al/Air ($O_2$), Al/$H_2O_2$, Al/$MnO_2$, Al/AgO, Al/S, Al/$K_3Fe(CN)_6$, and Al/NiOOH. In accordance with the present invention, an electrode bulk surface area of the cathode and an electrode bulk surface area of the anode are substantially stoichiometrically matched to satisfy diffusion of ions and to minimize side reactions forming hydrogen and oxygen gases.

In a specific embodiment, the ratio of the electrode bulk surface area of the anode to the electrode bulk surface area of the cathode is between 23% and 40%. However, the ratio presented is not meant to be limiting. The optimal ratio is dependent upon a variety of factors, including the physical configuration of the galvanic cell and the chemical reactions present.

According to a particular embodiment, an electrochemical cell described by the present invention includes an aluminum anode spaced from a sodium peroxide cathode by an electrically insulating barrier, the anode having an electrode bulk surface area and a cathode having an electrode bulk surface area, wherein the electrode bulk surface area of the anode and the electrode bulk surface area of the cathode are substantially stoichiometrically matched to satisfy an adequate diffusion of ions and to minimize side reactions. Additionally, it is within the scope of the present invention to substitute other metals for the aluminum anode. Accordingly, An electrochemical cell comprising a metal anode spaced from an alkali metal peroxide cathode by an electrically insulating barrier is provided. As with the aluminum anode embodiment, the electrode bulk surface area of the cathode and the electrode bulk surface area of the metal anode are substantially stoichiometrically matched to satisfy an adequate diffusion of ions and to minimize side reactions forming hydrogen and oxygen gases.

The electrochemical cell in accordance with the present invention provides many advantages over the other electrochemical cells known in the art. The use of an alkali metal peroxide in the cell results in different chemical reactions than those present in Aluminum/Hydrogen Peroxide cells known in the art. The chemical reactions in the galvanic cell of the present invention reduce the parasitic reactions inherent in the prior art, thereby providing a greater electrical energy output, thus increasing the cell's efficiency.

Additionally, the use of the alkali metal peroxide in the form of a solid, allows for the control of the dissolution rate of the alkali thereby optimizing the reaction rate of the cell and additional improvement in performance.

Establishing an optimal area ratio between the anode and the cathode provides an additional advantage over the prior art systems. Matching the cathode reactions of the galvanic cell using an aluminum anode to the chemistry of aluminum results in an optimum energy output for the cell.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
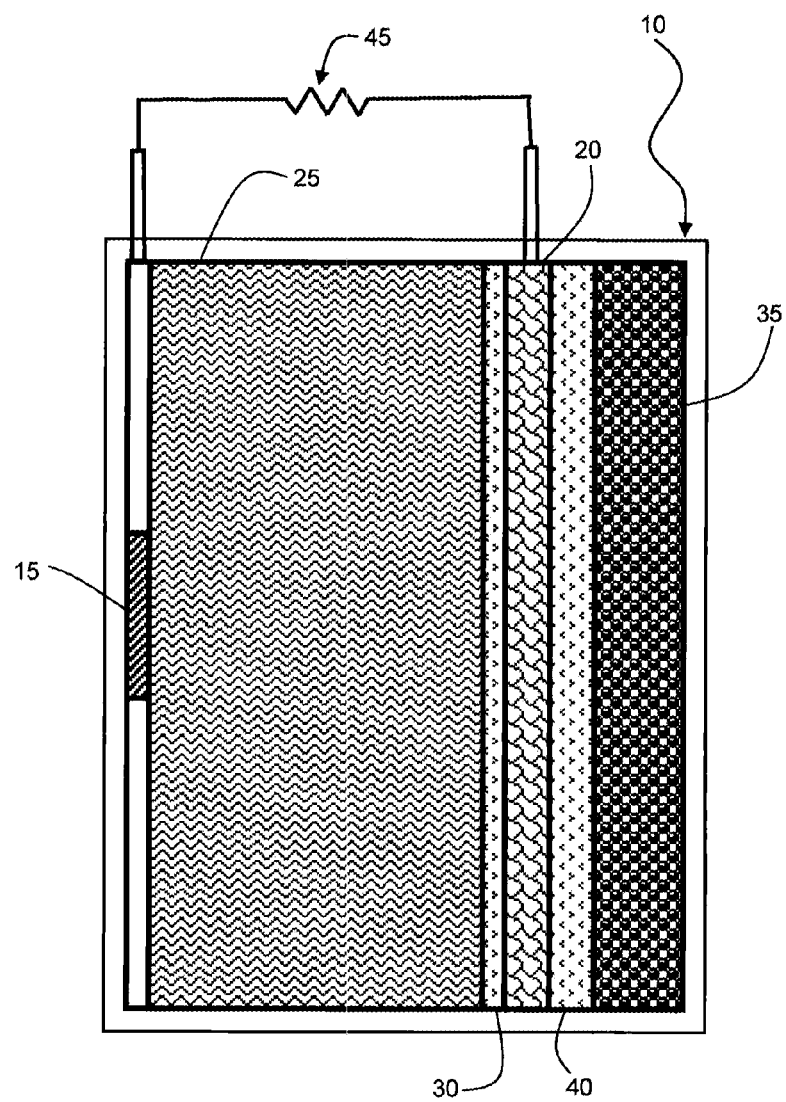
FIG. 1 is a schematic diagram of aluminum anode and alkali metal peroxide galvanic cell in accordance with the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Galvanic cells based upon aluminum as the anode are attractive because of the transfer of three electrons at a large oxidation potential. Problems arising from electrode scaling and competitive side reactions producing hydrogen and oxygen as products have limited the practical use of aluminum anode galvanic cells. Part of the source of the problem arises from failure to match the cathode reactions of galvanic cells using an aluminum anode to the chemistry of aluminum in order to obtain optimum energy output.

In accordance with the present invention, a galvanic cell is presented that combines the aqueous alkali reaction of aluminum metal at the anode with sodium peroxide as a representative alkali metal peroxide at the cathode to provide a high electrical energy output and at the same time minimize side reactions. It is within the scope of the present invention to substitute other metals for the aluminum anode. For the specific embodiment utilizing sodium peroxide, the overall the high-energy cell reaction in accordance with the present invention is described by:

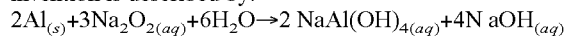
$2Al_{(s)} + 3Na_2O_{2(aq)} + 6H_2O \rightarrow 2\ NaAl(OH)_{4(aq)} + 4N\ aOH_{(aq)}$ When the sodium peroxide is consumed, any sodium hydroxide product reacts further with the aluminum hydroxide to give soluble sodium aluminate as an electrochemical reaction. Electrode geometry and the controlled release of alkali metal peroxide into the electrolyte are the factors that make this cell unique and capable of high-energy density service. Parasitic reactions are minimized because reactant concentrations are managed at low levels to inhibit side reactions. The use of a solid alkali metal peroxide such as sodium peroxide as the cathode reactant gives rise to different chemistry than that describing the use of hydrogen peroxide as the cathode reactant. Sodium hydroxide is a required reagent in order to start the electrochemical reaction of hydrogen peroxide and aluminum. Prior art for galvanic cells using aluminum as the anode treats the problems of scale formation and hydrogen formation by flushing the electrolyte through the cell and carrying any hydrogen or scale forming solids out of the cell.

This present invention introduces several improvements over the prior art electrochemical cells. First, the present invention uses alkali metal peroxide chemistry to gain the most control over the hydroxide ion production at the cathode. Even though galvanic cells using an aluminum anode with a hydrogen peroxide cathode reaction are well known, the substitution of sodium peroxide for hydrogen peroxide involves different reaction steps that result in a different overall cathode reaction and serve to overcome the problems encountered with hydrogen peroxide as the cathode oxygen source. This is shown in the following reaction steps:

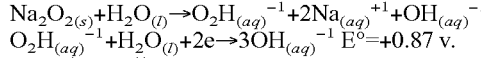
$Na_2O_{2(s)} + H_2O_{(l)} \rightarrow O_2H_{(aq)}^{-1} + 2Na_{(aq)}^{+1} + OH_{(aq)}^{-1}$

$O_2H_{(aq)}^{-1} + H_2O_{(l)} + 2e \rightarrow 3OH_{(aq)}^{-1}$   $E° = +0.87\ v.$ And overall:

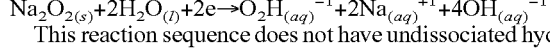
$Na_2O_{2(s)} + 2H_2O_{(l)} + 2e \rightarrow O_2H_{(aq)}^{-1} + 2Na_{(aq)}^{+1} + 4OH_{(aq)}^{-1}$ This reaction sequence does not have undissociated hydrogen peroxide or hydroxide ion present at the start of the reaction. Therefore the catalyzed decomposition of the hydrogen peroxide is avoided entirely or minimized. As the reaction progresses, sufficient hydroxide ion is produced such that sodium aluminate is the cell reaction product. Aluminum hydroxide as scale does not form.

Second, the present invention provides correlation of cell performance to the relative anode and cathode stoichiometry in terms of electrode bulk surface areas permitting a higher energy output relative to losses from parasitic reactions. For the specific chemical reaction cited above, inspection of the anode reactions and the cathode reactions show that the anode reaction has to occur twice and the cathode reaction has to occur three times in order to balance electron transfer. This relationship extends to the ion current in the cell. Anode surface area in excess of that needed to carry out the electrochemical reaction tends to be used for the side reactions. So the establishment of an optimum bulk surface area relationship between the anode and cathode in accordance with the present invention improves the power delivery from the cell. This improvement was observed for both the aluminum/hydrogen peroxide and the aluminum/sodium peroxide systems.

Third, an exemplary embodiment the present invention utilizes solid sodium peroxide in the cathode reaction. The use of solid sodium peroxide affords additional control of the cathode reaction. As a solid, the dissolution in water of the alkali is limited by the saturation coefficient of the solid, which is a thermodynamic variable, so the reaction rate is optimized by means of controlling the dissolution rate of the alkali. One of the major obstacles to overcome is the natural decomposition of the peroxides in humid environments, which is specific to the alkali used. Additionally, encasing the solid alkali and utilizing a removable impermeable or soluble membrane allows for additional control of dissolution. Since the sodium peroxide is initially present in the electrochemical cell as a solid, the hydroxide levels are further controlled by the dissolution of the sodium peroxide and the cathode reaction. Granular sodium peroxide dissolves and hydrolyzes to release hydroperoxide and hydroxide ions much more efficiently for utilization by the cell. Nearly all of the hydroxide ion released at the cathode is consumed by the aluminum and the corrosion reaction that releases hydrogen gas is avoided. Prior art for aluminum anode galvanic cells do not account for the cell performance in terms of the relative area of the anode and cathode. In the prior art the excess anode area leads to additional consumption of the aluminum anode by parasitic reactions, thus reducing anode efficiency.

In accordance with the present invention with specific reference to the use of sodium peroxide as the alkali metal peroxide, the overall galvanic cell reaction is given by:

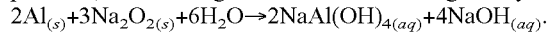

$2Al_{(s)} + 3Na_2O_{2(s)} + 6H_2O \rightarrow 2NaAl(OH)_{4(aq)} + 4NaOH_{(aq)}$.

Comparison of the electrochemical reaction for sodium peroxide with the electrochemical reaction for the hydrogen peroxide shows two additional differences are observed. Water is a necessary reagent to start this reaction while hydrogen peroxide requires the initial presence of hydroxide ion. Excess hydroxide ion is produced such that the aluminum hydroxide does not form as a scale. By contrast, soluble sodium aluminate is formed in the reaction of the present invention.

In an exemplary embodiment, the electrochemical cell 10 in accordance with the present invention utilizing an aluminum anode 15 with the sodium peroxide reaction at the cathode 20 can be further described with reference to FIG. 1. The anode 15 was 99.999% high purity aluminum cut from a casting. The anode was cut to a 1.0×5.0 cm size in order to have a bulk surface area of 5.0 cm$^2$ exposed to a 4 cm×10 cm cell cross section. The cathode 20 was made of woven silver plated copper wire formed to 2.25×8.5 cm size to give a bulk surface area of 19 cm$^2$ on the front and back faces of the electrode. The calculated specific surface area of the silver cathode was 493 cm$^2$, based on an average diameter of each wire strand (19 total) at 0.29 mm, and 2.85 m in length. These dimensions were experimentally determined in order to set up a balanced hydroxide and aluminate ion diffusion flow across the cell. The space between the anode and cathode electrodes was approximately 0.5 cm and it was filled with 35 ml of 1.0 M potassium hydroxide or 1.0 M potassium chloride as the electrolyte 25. A membrane of fiberglass cloth 30 was located between the cathode and anode in order to restrict direct contact. The sodium peroxide granules 35 were located in the cathode compartment such that any dissolved sodium peroxide passes through the cathode. A fiberglass cloth bag 40 was used to confine the sodium peroxide granules 35 behind the cathode 20. A load 45 is presented between the anode and the cathode.

In an additionally exemplary embodiment, in order to show that the chemistry for a galvanic cell made from an aluminum anode and alkali metal peroxide cathode reaction differs from a similar cell based upon a hydrogen peroxide cathode reaction, the comparison should be carried out at conditions requiring high performance in cell output. Since aluminum reacts with 4 hydroxide ions, several experiments are demonstrated performed in which the aluminum anode bulk surface area is varied relative to a fixed cathode area in order to observe the response in cell performance. In the experiments for this example potassium hydroxide (1.0M) was used as the electrolyte. Sodium peroxide granules (2.0 g) were used in the cathode reaction to supply hydroxide ions to the cell. This set of experiments was carried out with 100 ohms of load across the electrodes.

Figure 2:
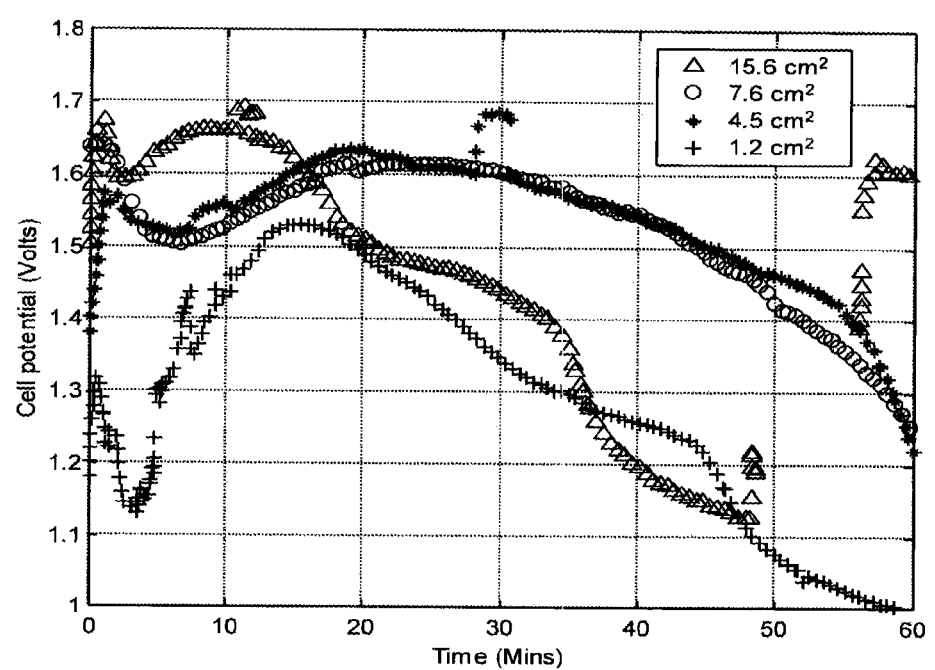
FIG. 2 is a graph showing the effects of anode area relative to a fixed cathode area on cell potential in accordance with the present invention.
Figure 3:
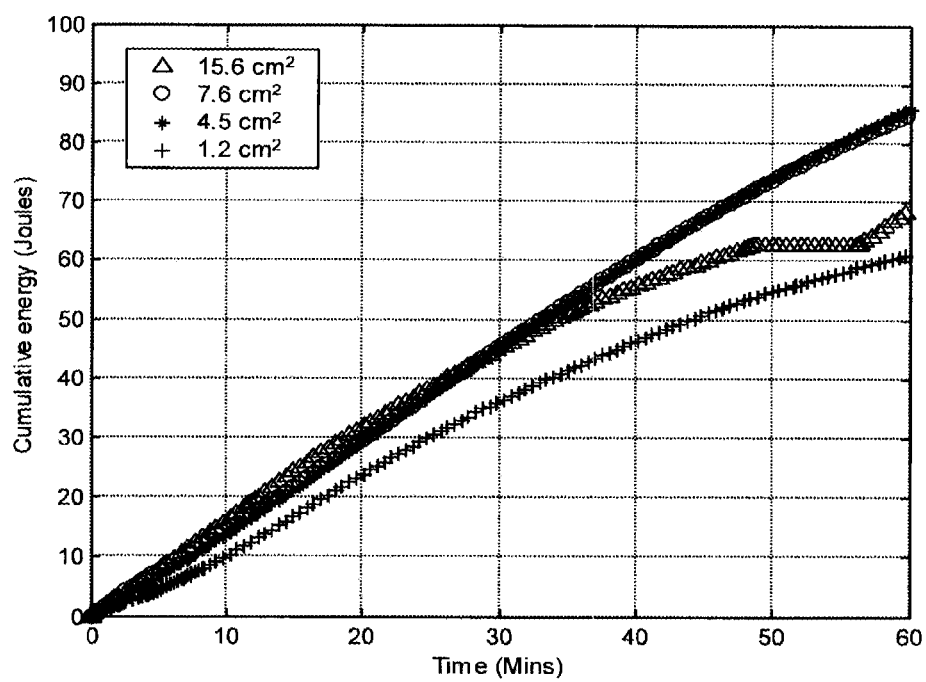
FIG. 3 is a graph showing the energy output from the anode area variation relative to a fixed cathode area in accordance with the present invention.

Potential output from the cell was observed as a function of time for selected anode areas as a means to show the effects of anode to cathode surface area ratio on performance of cells having a constant bulk surface area at the cathode. The results of this exemplary embodiment are summarized in FIG. 2. The shape of the potential curves for the intermediate anode areas is very similar, suggesting a similar reaction mechanism for those cases. The shape of the potential curves for the highest and lowest ratios exhibited steps that indicate several mechanisms were contributing to the output. As such, there is a dependence of cell output upon the relative areas of the anode to cathode. FIG. 3 presents the cumulative energy released from the cell as a function of time. From FIG. 3, a maximum rate of energy output for this system was observed for an anode to cathode area ratio between 0.23 and 0.40. With reference to FIG. 3 it is clear that there is an intermediate aluminum bulk surface area that at which the energy obtained is higher than that obtained for either the largest or the smallest areas. The diffusion limiting current of the anode was much larger than that of the cathode. As such the present invention establishes an optimal ratio for anode to cathode electrode area for a specific cell design and reagent amounts that would deliver the most energy from the electrochemical cell.

In another exemplary embodiment demonstrating the potential output as a function of current density, for the galvanic cell utilizing an aluminum anode and alkali metal peroxide cathode reaction in accordance with the present invention. This exemplary embodiment demonstrate the comparison of the potential output of a galvanic cell based upon the aluminum anode-alkali metal peroxide cathode system of the present invention with the aluminum anode-hydrogen peroxide cathode system known in the prior art. The performance of a galvanic cell is based upon the observed potential at a given current density drawn from the cell. The observed cell potential depends on combined anodic and cathodic over-potentials that lead to less voltage than the theoretical thermodynamic value for a given cell reaction. The over-potentials depend greatly on the cell design and the chemical reaction mechanisms at each electrode. Deviations of cell potential from theoretical values are usually identified with internal resistance, activation and concentration over-potential effects at each electrode. These polarization curves of the whole cell have been characterized relative to the same aluminum anode. In this exemplary embodiment, thes aluminum anode bulk surface area ratio to the cathode was kept at 0.26 for all measurements. Comparison of the polarization curves between aluminum anode galvanic cells using hydrogen peroxide at the cathode reaction and aluminum anode galvanic cells using sodium peroxide at the cathode demonstrates the different chemistry involved in the overall cell reaction.

Figure 4:
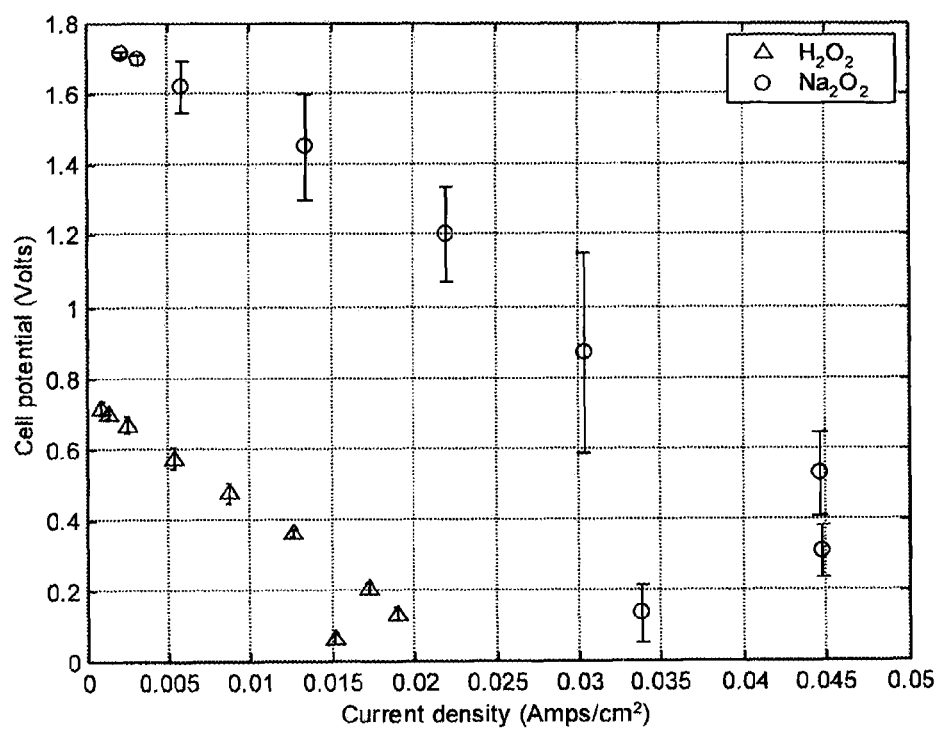
FIG. 4 is a graph showing the polarization-like plots for the two oxidizers when the electrolyte in the cell is a 1.0 M solution of KCl (35 mls) in accordance with the present invention.
Figure 5:
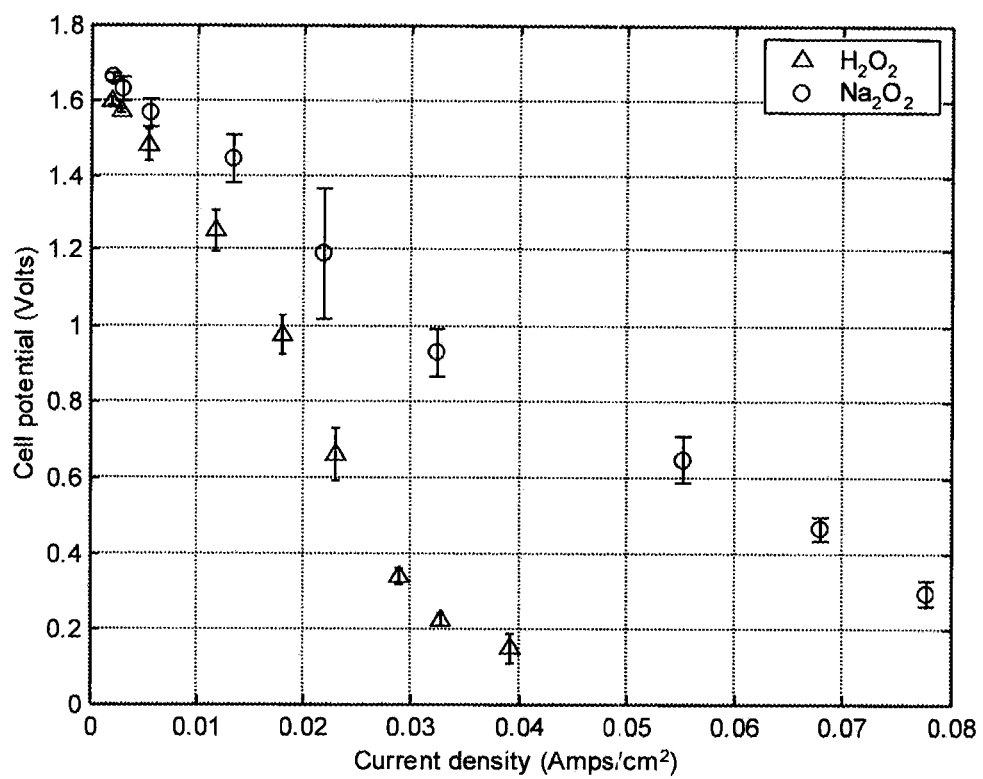
FIG. 5 is a graph showing the polarization-like plots for the two oxidizers when the electrolyte in the cell is a 1.0 M solution of KOH (35 mls) in accordance with the present invention.

The cell potential with a load of 10 ohms across the electrodes was observed as a function of time for each cell. The current flow was calculated for this resistance by means of Ohm's Law. Comparisons of the cells utilizing the hydrogen peroxide cathode with cells utilizing sodium peroxide cathode are shown in FIG. 4 for potassium chloride electrolyte and in FIG. 5 for potassium hydroxide electrolyte. In both FIG. 4 and FIG. 5, it is evident that the use of the solid sodium peroxide is advantageous over the hydrogen peroxide as the cathode reagent. Higher voltages as well as a consequent larger current are observed for the cases in which sodium peroxide is used. This advantage in the usage of sodium peroxide over the hydrogen peroxide is much larger for the cell using potassium chloride as the electrolyte. All of the hydroxide in this cell originated with the peroxide source. When the potassium hydroxide was used as the electrolyte, the advantage was still in favor of the sodium peroxide oxidant, but not quite as large. The difference in performance advantage for the sodium peroxide was diminished by the initial presence of hydroxide but the advantage was still significant.

In another exemplary embodiment, the performance comparisons of power density versus energy density for the galvanic cell of the present invention and that using hydrogen peroxide are shown. The rate at which a galvanic cell can deliver energy at a defined current is a critical selection factor for many applications. Power delivered by a cell depends upon the available energy output over a range of loads. Therefore, measurement of cell performance depends upon both the energy and the electrode kinetics available from an electrochemical reaction. Side reactions and diffusion limiting conditions reduce the power output. Measurements of the cell potential over a range of loads were used to calculate the power density as a function of current density for this evaluation of cell performance.

Figure 6:
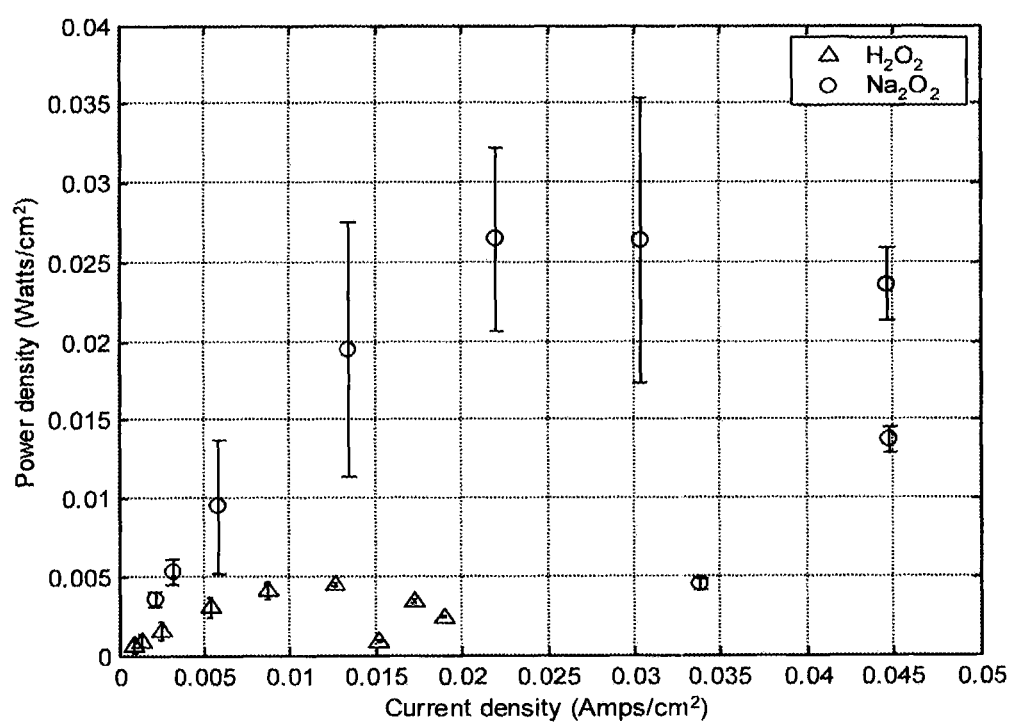
FIG. 6 is a graph showing the power density as a function of current density when 1.0M KCl is used as an electrolyte in accordance with the present invention.
Figure 7:
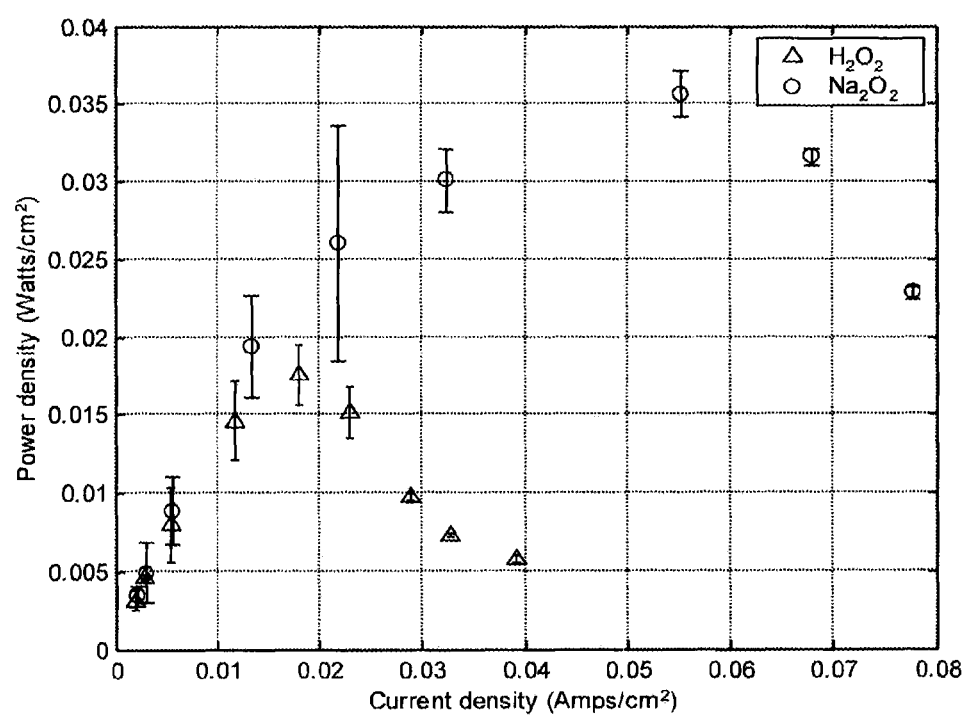
FIG. 7 is a graph showing the power density as a function of current density when 1.0M KOH is used as an electrolyte in accordance with the present invention.

In this exemplary embodiment, the performance measurements were carried out on cells that had an aluminum anode surface area to cathode area ratio of 0.26 to one. Comparisons of the performances for aluminum anode cells utilizing the hydrogen peroxide cathode reaction with cells utilizing sodium peroxide cathode reaction were evaluated on the basis of power density as a function of current density for potassium chloride and potassium hydroxide electrolytes. In FIG. 6 and FIG. 7 the power density (power output per unit area) as a function of current density (current flow per unit area) has been recorded and plotted, for the two cathode reactions. Maximum power density for the sodium peroxide cathode reaction was determined to be about 0.027 watts/cm2 at a current density of 0.025 amps/cm2 in potassium chloride electrolyte and 0.035 watts/cm2 of power density at 0.050 amps/cm2 in potassium hydroxide electrolyte. Maximum power density for the hydrogen peroxide cathode reaction was determined to be 0.005 watts/cm2 at a current density of 0.012 amps/cm2 in potassium chloride and 0.0017 watts/cm2 at a current density of 0.018 amps/cm2 in potassium hydroxide electrolyte.

Again the advantage of the alkali metal peroxide cathode reaction over the hydrogen peroxide cathode reaction is clearly evident in both potassium chloride and potassium hydroxide electrolytes.

In an additional exemplary embodiment of the present invention, comparison of energy available from aluminum anode and peroxide cathode galvanic cell under a 10 ohm load are demonstrated. From the practical point of view, the amount of energy delivered over a time interval defines the usefulness of a galvanic cell. Since the experiments were performed in a batch fashion, steady state for the voltage (and current) at a given time interval, was not reached. It was determined that the maximum power was obtained from resistances in the vicinity of 10 ohms load. For comparison purposes, 10 ohms was the load imposed in the cell electrode terminals for the experiments included in this example.

The cell voltage was recorded every ten seconds under a load of 10 ohms over a period of 25 minutes for the following experiments. The following figure shows the average voltage obtained from typically three replicates, for the electrolyte/cathode oxidizer combination cell. At each recorded cell potential the discrete power points can be calculated form the resistance load also as function of time. The energy dissipated by the resistance is calculated by numerically integrating the calculated power over the 25 minutes period, and are presented in the following plot, for the discussed cases in this experiment.

Figure 8:
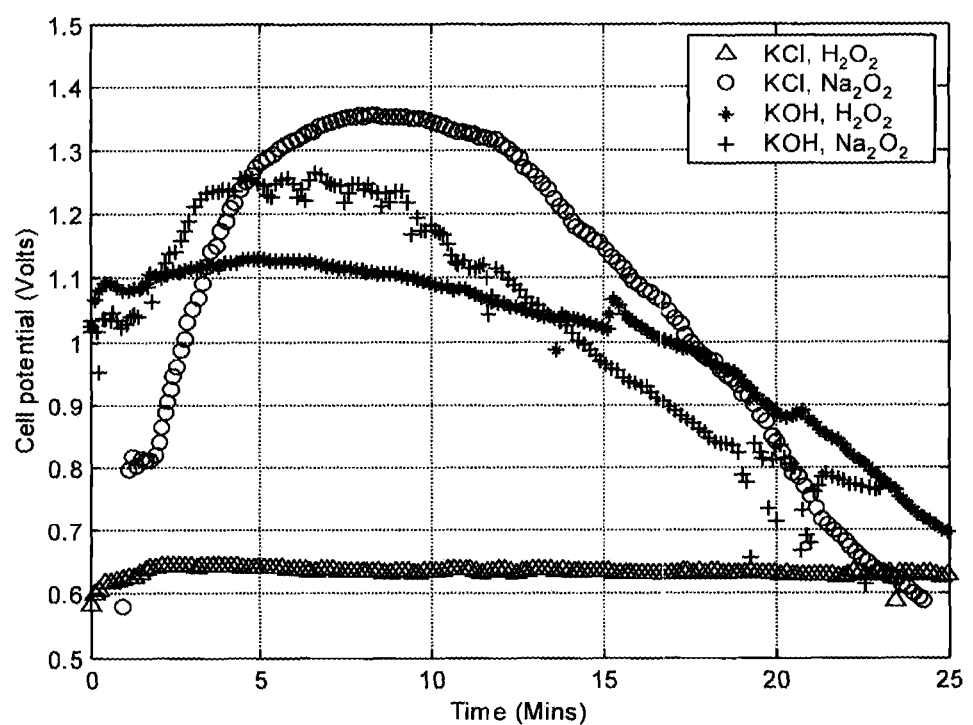
FIG. 8 is a graph showing the cell potential from cells having hydrogen peroxide and sodium peroxide cathode reactions as a function of time with a 10 ohm load across electrodes in accordance with the present invention.
Figure 9:
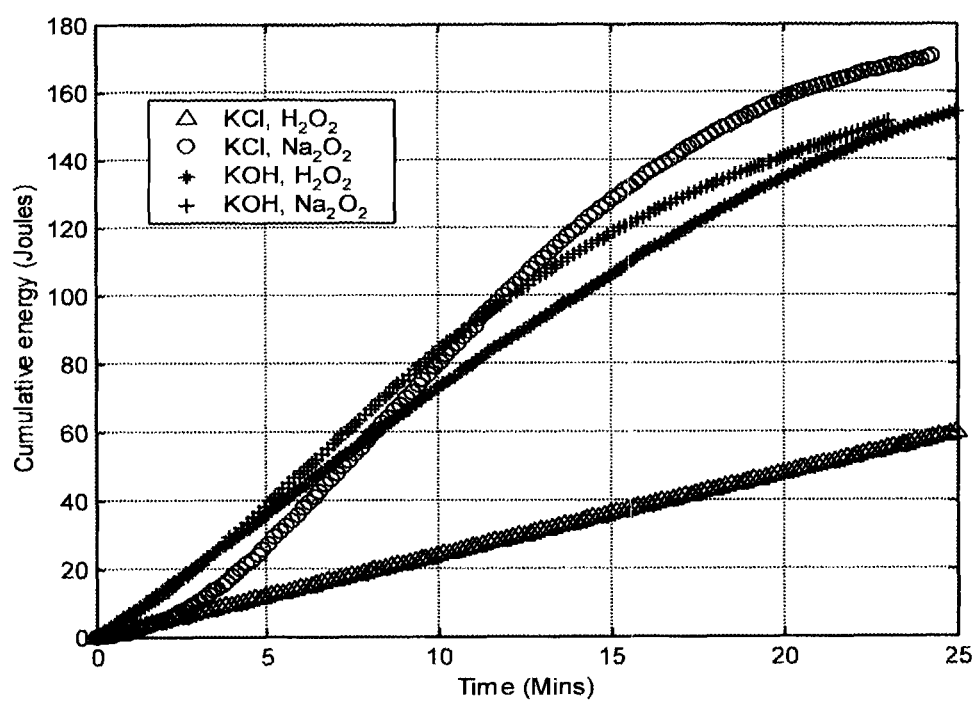
FIG. 9 is a graph showing the energy output as a function of time from cells having hydrogen peroxide and sodium peroxide cathode reactions with a 10 ohm load across electrodes in accordance with the present invention.
Figure 10:
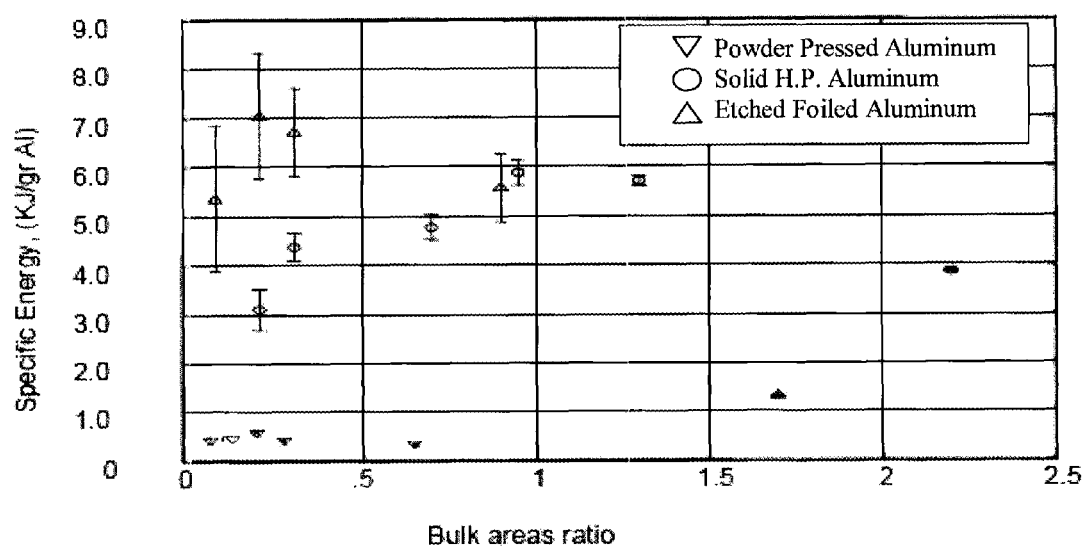
FIG. 10 is a graph showing the specific energy relative to the bulk area ratios for an alkaline aluminum $Na_2O_2$ system for three specific area systems: powder pressed aluminum, solid high purity Aluminum and Etched Foiled Aluminum.

FIG. 8 and FIG. 9 demonstrate that for that given load the cell provides more voltage and a larger amount of energy when the sodium peroxide is used, compared to the hydrogen peroxide in a given electrolyte. FIG. 8 also reveals that the energy delivered rate (power) for the hydrogen peroxide oxidizer cases is substantially constant for substantially the whole interval considered.

Additionally to the absolute energy delivered, the amount of materials used, should be of consideration when optimizing this type of electrochemical cells. In this experiment the amounts of aluminum loss were recorded, and found to be different for each case. A summary of the amount of energy available per unit gram of aluminum, and the amount of peroxide used for the four cases discussed in the last paragraph are presented in the following table:

| Electrolyte solution | Cell energy output over 25 minutes (kJ/g Al consumed) | |
|---|---|---|
| (30 mls) 1.0 M | Hydrogen Peroxide (3.5 ml 30% V) | Sodium Peroxide (2.0 g) |
| KCl | 5.6 | 8.4 |
| NaOH | 13.1 | 8.1 |

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An electrochemical cell comprising;
an aluminum anode having an electrode bulk surface area;
a fiberglass cloth;
a cathode having an electrode bulk surface area, the cathode comprising a woven metal electrode and a solid alkali peroxide, the cathode positioned adjacent to the first fiberglass cloth, the woven metal electrode of the cathode positioned such that the first fiberglass cloth is between the woven metal electrode and the aluminum anode and the solid alkali peroxide of the cathode positioned such that the woven metal electrode is between the solid alkali peroxide and the first fiberglass cloth, wherein the electrode bulk surface area of the anode and the electrode bulk surface area of the cathode are substantially stoichiometrically matched to satisfy diffusion of ions and to minimize side reactions; and
an aqueous electrolyte.

2. The electrochemical cell of claim 1, wherein the ratio of the electrode bulk surface area of the anode to the electrode bulk surface area of the cathode is between 23% and 40%.

3. The electrochemical cell of claim 1, wherein the anode and the cathode are positioned within the aqueous electrolyte.

4. The electrochemical cell of claim 1, wherein the solid alkali peroxide is sodium peroxide.

5. The electrochemical cell of claim 1, wherein the solid alkali peroxide dissolves in the aqueous electrolyte, such that the dissolved alkali peroxide passes through the woven metal electrode.

6. The electrochemical cell of claim 4, wherein the sodium peroxide is solid granular sodium peroxide.

7. The electrochemical cell of claim 1, wherein the woven metal electrode is woven silver plated copper wire.

8. The electrochemical cell of claim 1, wherein the aluminum employed in the anode is at least 99.999% pure aluminum.

9. The electrochemical cell of claim 1, wherein the electrolyte solution is potassium chloride.

10. The electrochemical cell of claim 1, wherein the electrolyte solution is potassium hydroxide.

11. The electrochemical cell of claim 1, wherein the aqueous electrolyte is water.

12. The electrochemical cell of claim 1, wherein the aqueous electrolyte is an aqueous hydroxide solution.

13. The electrochemical cell of claim 1, wherein the aqueous electrolyte is an aqueous salt solution.

* * * * *